J. V. A. Wemple.
Harvester Rake.
Nº 23730        Patented Apr. 19, 1859.
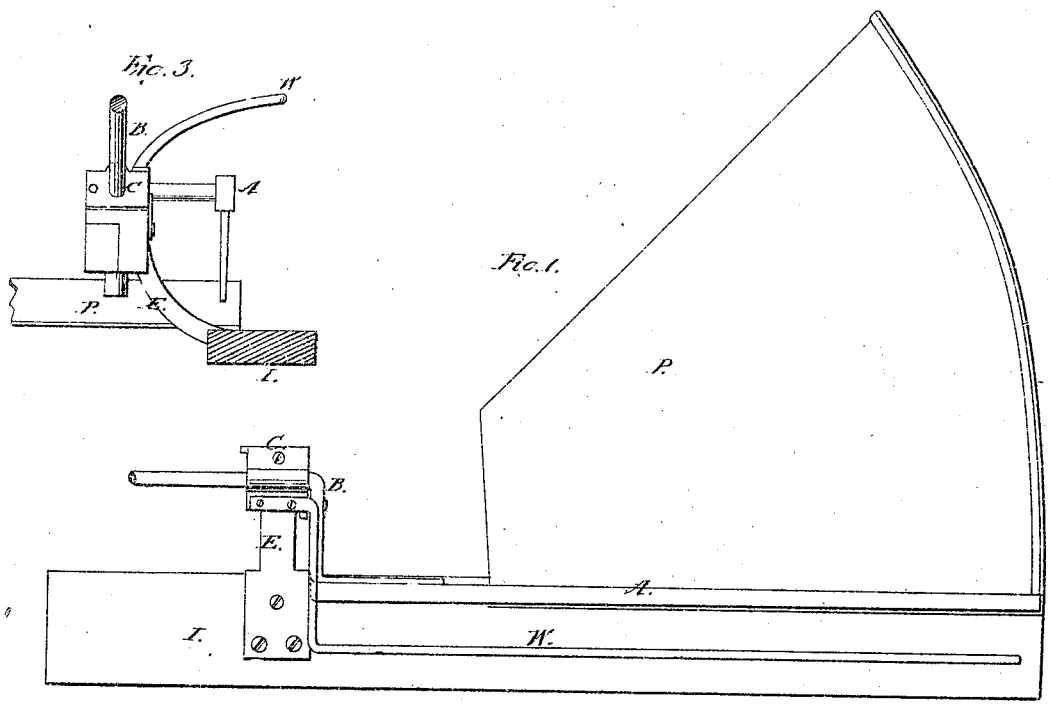
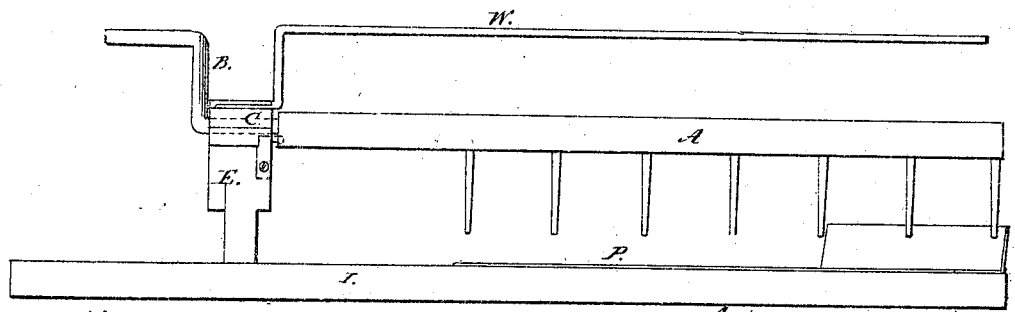
Witnesses:
Geo Patten
Jack Clay
Inventor:
Jacob V. A. Wemple

UNITED STATES PATENT OFFICE.

J. V. A. WEMPLE, OF CHICAGO, ILLINOIS.

IMPROVEMENT IN HARVESTERS.

Specification forming part of Letters Patent No. 23,730, dated April 19, 1859.

*To all whom it may concern:*

Be it known that I, J. V. A. WEMPLE, of Chicago, in the county of Cook and State of Illinois, have invented a new and useful Improvement in Raking Attachments of Harvesters; and I do hereby declare that the following is a full, clear, and exact description of the same, reference being had to the annexed drawings, forming part of this specification, in the several figures of which similar characters of reference denote the same parts.

Figure 1 is a plan view, showing finger-bar, platform, rake, and guard. Fig. 2 is a front view of the same. Fig. 3 is an end view of same.

The invention here considered is an improvement on the raking attachment patented by J. V. A. Wemple and A. Wemple on the 16th day of February, 1858, and is designed to prevent the grain from falling upon and into the teeth of the uplifted rake as it takes its position over the front of the platform previous to its descent thereon, and also from falling upon the rake after its descent.

The invention consists of a bar or rod permanently fixed to the swivel-box, named in the aforesaid patent, at the maximum elevation of the rake, and sufficiently advanced to the front to receive the falling grain, that would otherwise fall into the teeth and interfere with the operation of the machine.

The details of construction and operation will be understood from the following description and reference to the drawings, in which—

A is the rake, P the platform, I the finger-bar, E the standard, C the swivel-box, and B the crank, the operation of which is described in the patent above named.

In addition to the said parts, there is permanently secured to the swivel-box C the guard W, consisting of a bar having an elevation above the platform equal to the maximum elevation of the rake-teeth, and projecting sufficiently far to the front to mask the teeth of the rake as it moves into its extreme front position previous to its dropping upon the platform preparatory to making the sweep thereof. This bar receives the grain and prevents it from entering between the teeth, and also prevents the grain from falling upon the rake as it moves upon the platform. The guard, being secured to the swivel-box, moves with the rake, and allows the grain resting against it to fall upon the platform after the rake is clear of it. In this manner the grain is received upon the platform and removed therefrom without becoming entangled with the rake. The position of the guard here described, by preventing the grain from entering between the rake-teeth, effects the object in view in the best manner, though if the guard had such a position as to be behind the rake when elevated it would nevertheless prevent the grain from falling upon the rake after its descent, and thus prevent the dragging of the falling grain with that already on the platform and in front of the rake-teeth.

Having described my invention and the operation thereof, what I claim as new, and desire to secure by Letters Patent, is—

The guard-rod W, to separate the falling grain from that which lies on the platform while the rake is passing down to lay hold thereof, and also to prevent the grain from falling on the rake, arranged and operated substantially in the manner described.

In testimony whereof I have hereunto signed my name before two subscribing witnesses.

JACOB V. A. WEMPLE.

Witnesses:
GEO. PATTEN,
JOHN S. HOLLINGSHEAD.